: 3,548,266
NICKEL-NICKEL OXIDE CAPACITOR
Franklin D. Frantz, Woodford, Vt., assignor to Sprague Electric Company, North Adams, Mass., a corporation of Massachusetts
Filed Nov. 14, 1968, Ser. No. 775,727
Int. Cl. H01g 3/06
U.S. Cl. 317—230
3 Claims

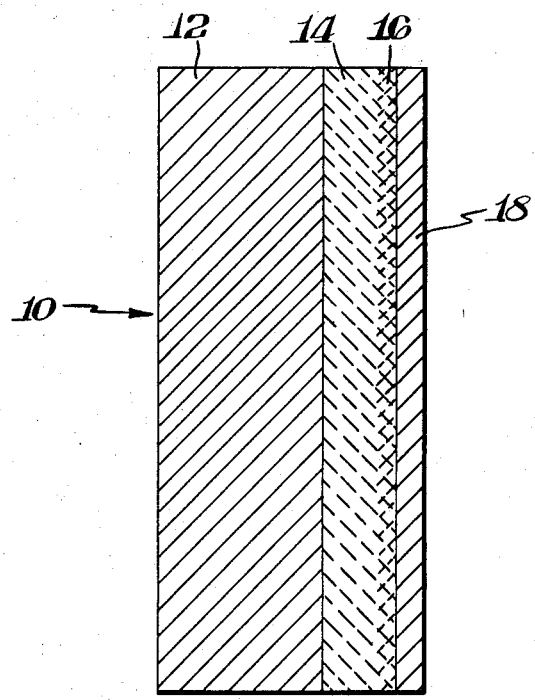

ABSTRACT OF THE DISCLOSURE

A capacitor has a nickel electrode having a nickel oxide film thereon. At the surface of the nickel oxide layer there is a region of inter-reacted oxides of nickel, magnesium and aluminum. A counterelectrode is affixed to the region of inter-reacted oxides.

BACKGROUND OF THE INVENTION

The present invention is concerned with an improved nickel-nickel oxide capacitor.

Commercial nickel oxide capacitors are comparatively new and are somewhat difficult to manufacture because of the difficulty of forming mechanically and electrically excellent nickel oxide dielectrics. Nickel oxide is a comparatively fragile and porous dielectric which also leaves something to be desired as far as insulation resistance is concerned. Any improvement in the physical strength of the oxide and improved insulation resistance characteristics would be a significant advance in this type of a capacitor.

It is an object of the present invention to present a novel nickel-nickel oxide capacitor.

It is another object to present a nickel-nickel oxide capacitor which has improved physical characteristics.

It is yet another object of the invention to present a nickel-nickel oxide capacitor having improved insulation resistance.

These and other objects of the present invention will become apparent to those skilled in the art by the following description.

SUMMARY OF THE INVENTION

The present invention is concerned with a capacitor comprising a nickel electrode having a nickel oxide layer formed thereon. The nickel oxide layer has at the surface thereof, a region of inter-reacted oxides of nickel, magnesium and aluminum. A counterelectrode is in contact with the region of inter-reacted oxides.

BRIEF DESCRIPTION OF THE DRAWING

The figure of the drawing shows a side sectional view of a capacitor of the present invention.

In the drawing a capacitor 10 has a nickel counterelectrode 12 having a nickel oxide 14 formed thereon. A surface region 16 of inter-reacted oxides of nickel, magnesium and aluminum has a metal counterelectrode 18 applied thereto.

DETAILED DESCRIPTION OF THE INVENTION

Example

A plurality of nickel discs, 5 mils thick and ½ inch in diameter, are thermally oxidized in a tunnel kiln to yield an oxide film thereon having an average breakdown voltage of about 30 volts. A commercially prepared 5% solution of magnesium methylate in methyl alcohol is applied to a broad oxidized surface of the discs. The units are exposed to a moisture laden atomsphere to convert the magnesium methylate to $MgO \cdot Mg(OH)_2$. A commercially available counterelectrode paint containing silver and a glass frit is milled with a proportion of alumina which constitutes a slight excess over the stoichiometric amount necessary to form a spinel-like structure with the NiO and the $MgO \cdot Mg(OH)_2$. This proportion insures a weight ratio of MgO to $Al_2O_3$ of 2:5 with a slight excess of alumina. This preparation is applied to the $MgO \cdot Mg(OH)_2$. The unit is then fired at a temperature between 1400–1650° F. The capacitor is completed by removal of nickel oxide from the surface opposite to that having the silver counterelectrode and contacts are then made to the nickel and the silver.

The resulting units have a nickel oxide dielectric with a surface region of inter-reacted oxides of nickel, magnesium and aluminum. The units of the present invention, when compared with nickel-nickel oxide capacitors not prepared according to the present invention, have a dielectric oxide which is mechanically far stronger and have an insulation resistance which is significantly higher.

While some latitude can be tolerated it is preferred that the weight ratio of MgO to $Al_2O_3$ be maintained about 2:5. This will insure the formation of the desired inter-reacted NiO, MgO and $Al_2O_3$.

While not intending to be bound by any theory, it is believed that the treatment according to the present invention results in the formation of a spinel type structure in the surface of the nickel oxide dielectric and that this results in a decrease in the porosity of the nickel oxide with an increase in its mechanical strength and a significant increase in the insulation resistance of the dielectric.

It is to be understood that the means by which the magnesium oxide and aluminum oxide is introduced into the surface of the nickel oxide can be accomplished by various means and the technique recited in the specific example is merely by way of illustration. Other techniques of introducing these oxides will be obvious to those skilled in the art. For example a combination suspension of magnesium oxide and aluminum oxide could be applied to the surface of the nickel oxide. The metal of the counterelectrode can be any noble metal, such as silver, gold, the platinum group metals or any alloy thereof. It is also to be understood that solid electrolytes, such as $MnO_2$ can be employed as the counterelectrode.

As is evident from the foregoing, the invention is not to be limited to formation of the rather specific illustrative device. Modifications and variations, as well as the substitution of equivalents may be made without departing from the spirit of the invention as defined in the appended claims.

What is claimed is:

1. A capacitor comprising a nickel electrode having a nickel oxide layer formed thereon, said nickel oxide layer having a surface region of inter-reacted oxides of nickel, magnesium and aluminum; and a counterelectrode on said dielectric.

2. The capacitor of claim 1 wherein said counterelectrode is an alumina containing noble metal counterelectrode.

3. The method of forming a capacitor comprising forming a nickel oxide on the surface of a nickel electrode; applying a magnesium methylate solution to the surface of said nickel oxide; exposing the so-treated surface to a moisture laden atmosphere to convert said magnesium methylate to MgO·Mg(OH)$_2$; applying an alumina-containing noble metal counterelectrode paint to said treated surface; and firing the unit at a temperature between 1400–1650° F.

References Cited

UNITED STATES PATENTS

| | | | |
|---|---|---|---|
| 2,720,573 | 10/1955 | Lundquist | 317—238X |
| 2,749,489 | 6/1956 | Mayer et al. | 317—238 |
| 3,142,594 | 7/1964 | Bake | 317—238X |
| 3,353,124 | 11/1964 | Dilger | 317—258X |
| 3,424,955 | 1/1969 | Sieter et al. | 317—238X |

FOREIGN PATENTS

| | | | |
|---|---|---|---|
| 685,168 | 4/1964 | Canada | 317—238 |

JAMES D. KALLAM, Primary Examiner

U.S. Cl. X.R.

317—238, 258